US010715824B2

(12) United States Patent
Tall et al.

(10) Patent No.: US 10,715,824 B2
(45) Date of Patent: Jul. 14, 2020

(54) SYSTEM AND METHOD FOR DATA COMPRESSING OPTICAL SENSOR DATA PRIOR TO TRANSFERRING TO A HOST SYSTEM

(71) Applicant: Facebook Technologies, LLC, Menlo Park, CA (US)

(72) Inventors: Martin Henrik Tall, Frederiksberg C. (DK); Sune Loje, Snekkersten (DK); Javier San Agustin Lopez, Copenhagen S. (DK)

(73) Assignee: Facebook Technologies, LLC, Menlo Park, CA (US)

( * ) Notice: Subject to any disclaimer, the term of this patent is extended or adjusted under 35 U.S.C. 154(b) by 325 days.

(21) Appl. No.: 15/461,276

(22) Filed: Mar. 16, 2017

(65) Prior Publication Data

US 2017/0272768 A1 Sep. 21, 2017

Related U.S. Application Data

(60) Provisional application No. 62/309,750, filed on Mar. 17, 2016.

(51) Int. Cl.
| | |
|---|---|
| *H04N 19/00* | (2014.01) |
| *H04N 19/426* | (2014.01) |
| *H04N 19/136* | (2014.01) |
| *G06K 9/00* | (2006.01) |
| *G06K 9/52* | (2006.01) |
| *H04N 19/167* | (2014.01) |
| *H04N 19/93* | (2014.01) |

(Continued)

(52) U.S. Cl.
CPC ......... *H04N 19/426* (2014.11); *G06K 9/0061* (2013.01); *G06K 9/00617* (2013.01); *G06K 9/52* (2013.01); *H04N 19/136* (2014.11); *H04N 19/167* (2014.11); *H04N 19/93* (2014.11); *G06K 2009/4666* (2013.01); *H04N 19/65* (2014.11)

(58) Field of Classification Search
CPC .................................................. H04N 19/426
See application file for complete search history.

(56) References Cited

U.S. PATENT DOCUMENTS

| | | | | |
|---|---|---|---|---|
| 5,710,838 | A * | 1/1998 | Jung | .......... G06T 9/20 |
| | | | | 375/E7.081 |
| 6,417,867 | B1 * | 7/2002 | Hallberg | ............... G06T 3/0025 |
| | | | | 345/660 |

(Continued)

*Primary Examiner* — Dave Czekaj
*Assistant Examiner* — Shanika M Brumfield
(74) *Attorney, Agent, or Firm* — Fenwick & West LLP

(57) ABSTRACT

Systems and methods for reducing, with minimal loss, optical sensor data to be conveyed to another system for processing. An eye tracking device, such as a head-mounted display (HMD), includes a sensor and circuitry. The sensor generates image data of an eye. The circuitry receives the image data, and assigns pixels of the image data to a feature region of the eye by comparing pixel values of the pixels to a threshold value. A feature region refers to an eye region of interest for eye tracking, such as a pupil or glint. The circuitry generates encoded image data by apply an encoding algorithm, such as a run-length encoding algorithm or contour encoding algorithm, to the image data for the pixels of the feature region. The circuitry transmits the encoded image data, having a smaller data size than the image data received from the sensor, for gaze contingent content rendering.

17 Claims, 14 Drawing Sheets

(51) Int. Cl.
*G06K 9/46* (2006.01)
*H04N 19/65* (2014.01)

(56) References Cited

U.S. PATENT DOCUMENTS

| | | | |
|---|---|---|---|
| 2006/0044636 A1* | 3/2006 | Iinuma | H04N 1/387 |
| | | | 358/540 |
| 2008/0304737 A1* | 12/2008 | Kajita | G02B 27/017 |
| | | | 382/165 |
| 2015/0131920 A1* | 5/2015 | Lee | H04N 19/167 |
| | | | 382/233 |
| 2015/0160726 A1* | 6/2015 | Sullivan | G06F 3/013 |
| | | | 345/156 |

* cited by examiner

| Threshold value | Number of elements - max 16384 pixels |
|---|---|
| 0 | 0/1 0/1 0/1 0/1 0/1 0/1 0/1 0/1 0/1 0/1 0/1 0/1 0/1 0/1 0/1 |
| 2 bits | 14 bits |

Figure 8

| Background | Number of elements - max 32768 pixels |
|---|---|
| 1 | 0/1 0/1 0/1 0/1 0/1 0/1 0/1 0/1 0/1 0/1 0/1 0/1 0/1 0/1 0/1 |
| 1 bit | 15 bits |

SYSTEM AND METHOD FOR DATA COMPRESSING OPTICAL SENSOR DATA PRIOR TO TRANSFERRING TO A HOST SYSTEM

CROSS-REFERENCE TO RELATED APPLICATIONS

This application claims the benefit of U.S. Provisional Patent Application No. 62/309,750, filed Mar. 17, 2016, which is incorporated by reference herein.

TECHNICAL FIELD

The present invention relates to data compression of eye-tracking picture-element (pixel) data prior to conveying the data to a host system.

BACKGROUND

Eye tracking provides for control operation of devices as an alternative to physical control interaction is being adopted by a variety of systems.

Eye tracking sensors typically produce a lot of binary data when associating object position, intensity and color information for each pixel. That, in turn, requires processors capable of handling voluminous data which can adversely affect device cost and battery life.

This is especially true in smaller devices, such a virtual reality (VR) and augmented reality (AR) head-mounted displays (HMDs) and related subsystems.

SUMMARY

Systems and methods for processing data produced by eye-tracking optical sensors are discussed herein. Data compression of optical-sensor produced image data reduces the amount of data to be conveyed to a host system.

Some embodiments may include a method of encoding image data generated by a sensor for eye tracking. The method includes receiving a stream of image data of an eye generated by a sensor, and assigning a plurality of pixels of the image data to a feature region of the eye by comparing pixel values of the plurality of pixels to a threshold value. The image data of the eye has a plurality of regions including the feature region. The method further includes generating encoded image data by apply an encoding algorithm to the image data for the plurality of pixels of the feature region. The method further includes transmitting an output stream including the encoded image data to a computing device (e.g., a host system). The encoded image data having a smaller data size than the image data, and thus less amounts of data is transmitted in the output stream.

Various encoding algorithms may be used. For example, a run-length encoding algorithm uses a run-length encoding format to encode feature regions. In another example, a contour encoding algorithm uses a contour encoding format to encode the contour between feature regions and, for example, the background region.

Some embodiments may include an eye tracking device. The eye tracking device includes a sensor and circuitry. The sensor generates image data of an eye. The circuitry is configured to: receive the image data generated by the sensor; assign pixels of the image data to a feature region of the eye by comparing pixel values of the pixels to a threshold value, the image data of the eye having a plurality of regions including the feature region; generate encoded image data by apply an encoding algorithm to the image data for the pixels of the feature region, the encoded image data having a smaller data size than the image data; and transmit the encoded image data to a computing device separate from the eye tracking device.

A non-transitory computer readable medium storing instructions that when executed by a processor, configures the processor to generate and transmit encoded image data from image data generated by a sensor.

Through compression, encoded image data of the eye that can be used for eye tracking is conveyed to a separate computing device or host system via smaller data streams, lowering bandwidth requirements of the communication link between the eye tracking device (including sensor) and the computing device, and reducing processing workload of the computing device when analyzing the data stream for eye position tracking.

As a result, the computing device is considerably less tasked with handling and processing eye-tracking optical sensor data, so less costly processing can be used, and battery life is extended because of lower power requirements. Furthermore, the bandwidth requirements for the connection between the eye tracking device and the computing device can be reduced.

BRIEF DESCRIPTIONS OF THE DRAWINGS

FIG. 8 illustrates a run-length encoding using 2 bits to distinguish between pupil, glints and background, in accordance with some embodiments.

FIG. 9 illustrates a run-length encoding using 1 bit to distinguish between glints or pupil and background, in accordance with some embodiments.

FIG. 13 illustrates a run-length encoding for pupil or glints using 32 bits, in accordance with some embodiments.

FIG. 14 illustrates a contour encoding for pupil or glints using 24 bits, in accordance with some embodiments.

DETAILED DESCRIPTION

Eye tracking provides for control a system based on the detected gaze position of a viewer's eye and the duration of the gaze, for example. Some systems comprise an optical sensor where images projected on a photon sensory area are detected and digitized according to location in the projected area, intensity of light, and color. Information about the image is created by essentially scanning each pixel location, in turn, and sending its digital data as part of a sequence of such data that comprises location, intensity and color for each such pixel.

If each pixel is described by its data bits, and each pixel is detected and described in terms of location, degree of intensity, and color or shades of grey, the resulting data stream for a reasonable-size image with typical picture-element resolution (e.g. density of pixels per linear metric) will be very bit intensive. That, in turn, will affect the rate at which the data must be sent and the memory buffer space used to contain it as it is conveyed to a host processor for processing.

For battery-powered systems, such as virtual-reality or augmented-reality goggles, sending bit-intensive data streams and having large image buffer memories affects the battery power required and, thus, the battery life or time between charging instances.

Because eye-tracking subsystems are intended for accurately determining where someone is gazing and not necessarily for capturing high-resolution features and colors of an eye, it is possible to reduce the amount of data needed for eye-tracking processing and, therefore, the amount of data that must be conveyed by a sensor subsystem to a host system for processing.

Figure 1:
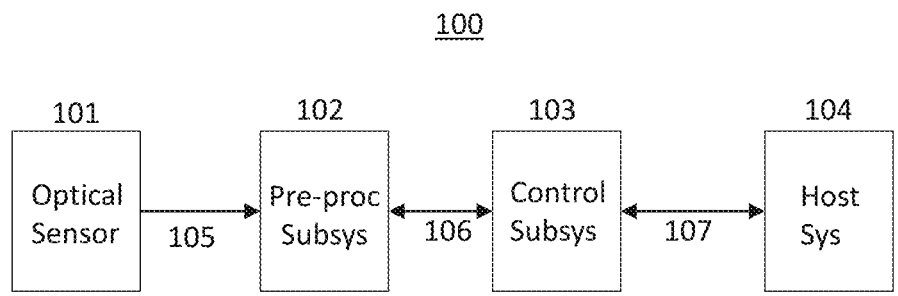
FIG. 1 illustrates a system for eye tracking, in accordance with some embodiments.
Figure 17:
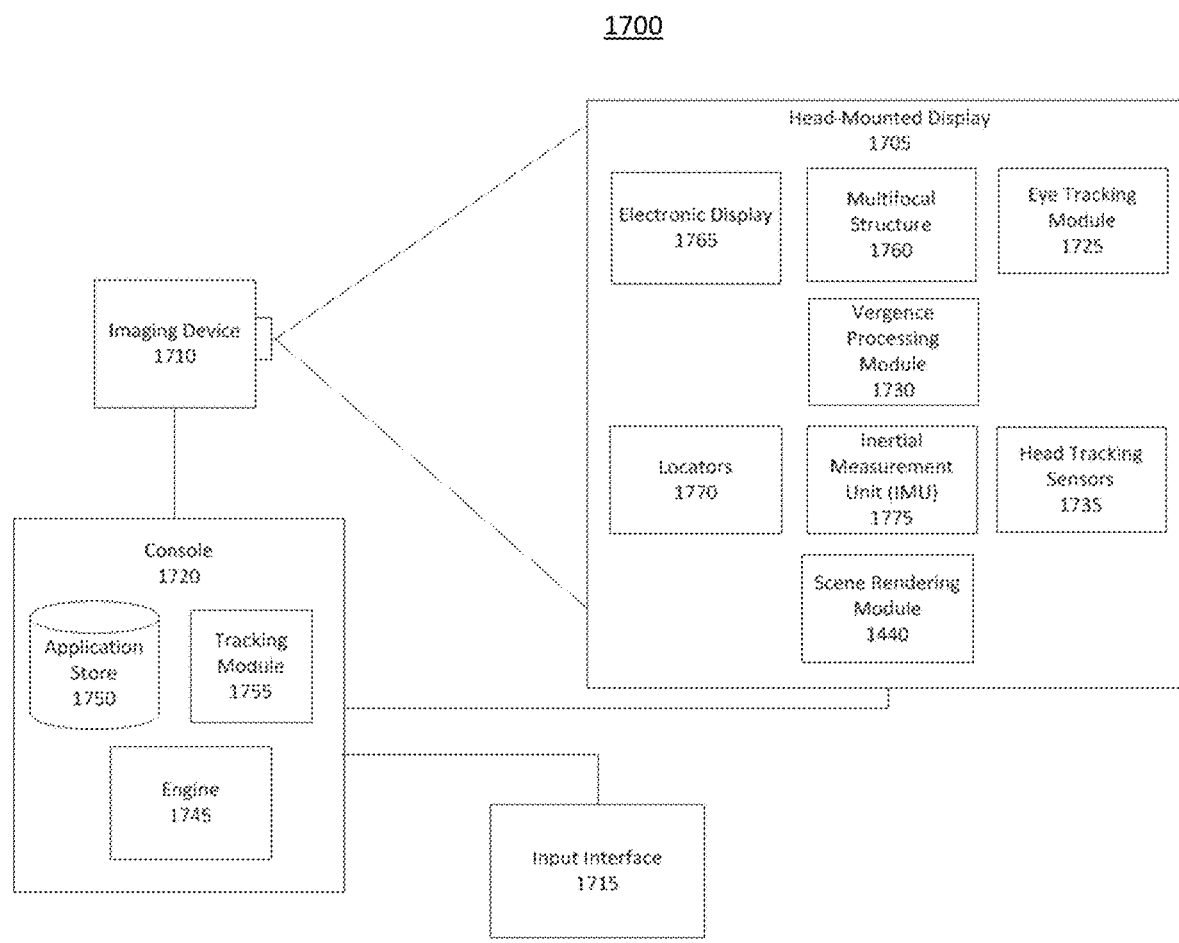
FIG. 17 illustrates a system in which a HMD operates, according to an embodiment.

FIG. 1 illustrates an example of a system 100 for reducing the amount of raw data produced by a sensor before conveying it to a host system. The system 100 has circuitry including an optical sensor subsystem 101, a pre-processing subsystem 102, a control subsystem 103, and a host system 104. Some embodiments of the system 100 have different components than those described here. Similarly, in some cases, functions can be distributed among the components in a different manner than is described here. The components of the system 100 may be incorporated within a system including an HMD, as shown in FIG. 17.

The optical sensor subsystem 101 sends its raw image data to the pre-processing subsystem 102 over a data path 105. The optical sensor subsystem 101 includes a sensor, such as an optical sensor. In some embodiments, the optical sensor may be an invisible (e.g., infrared) light detector that detects invisible light reflected from the eye of the user. The invisible light may be generated by an invisible light emitter (e.g., infrared light emitter). The invisible light emitter may be located in the HMD with the optical sensor subsystem 101 to emit the invisible light onto the eyes of the viewer.

The optical sensor subsystem 101 generates image data over time of the eyes based on the captured invisible light. The image data may include frames of images, with each image including a matrix of pixels having pixel values.

The pre-processing subsystem 102 generates encoded image data by applying an encoding algorithm to the image data generated by the optical sensor subsystem 101. The pre-processing subsystem 102 uses one or more data compression approaches based on a program or programs sent to it by the control subsystem 103, such as over a (e.g., bi-directional) data path 106. In response to configurations specified by the control subsystem 103, the pre-processing subsystem 102 applies a data compression to the image data, and transmits the encoded image data via a data stream using the data path 106 to the control subsystem 103. Examples of data compression algorithms are discussed below and shown in FIGS. 2 through 15.

The control subsystem 103 can send the encoded image data to the host system 104 using a (e.g., bi-directional) data path 107. In some embodiments, the pre-processing subsystem 102 transmits the encoded image data directly to the host system 104. The host system 104 may also send programs, commands, and control data to the control subsystem 103 via the datapath 107 that specifies the encoding format, threshold levels for feature region detection, etc. The datapath 107 may include a wired (e.g., universal serial bus (USB)) connection or a wireless connection (e.g., Bluetooth, Wi-Fi, etc.). The encoded image data reduces the bandwidth requirements of the datapath 107 used to transmit information that can be processed for eye tracking at the host system 104.

In some embodiments, the pre-processing subsystem 102 and control subsystem 103 are integrated into a circuitry that communicates with the optical sensor subsystem 101 and host system 104.

Figure 2:
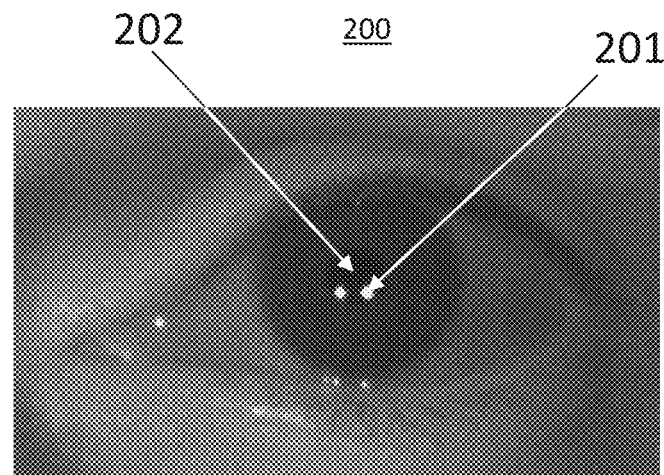
FIG. 2 illustrates the image of a human eye as detected by a sensor, in accordance with some embodiments.

FIG. 2 illustrates an image 200 of an eye projected on a sensory area. The sensory area refers to an area captured by the optical sensor subsystem 101 that includes the eye. For purposes of eye-tracking, important image features include a pupil 202 and reflected glints 201 from a light source or multiple sources. The regions of the image 200 that include these image features for eye-tracking are referred to herein as "feature regions." However, the entire image 200 of the eye includes non-feature regions, such as surrounding background regions. These non-feature regions of the image 200 are defined by sensor data with parameters such as location, intensity and color. If the unencoded image 200 is transmitted to the host system 104, the non-feature regions will contribute to the size of the output data stream. Because the image data generated by the sensor for the feature regions is sufficient for the purposes of eye tracking, an encoding that uses the feature regions and discards non-feature regions can be used to reduce the size of the output data stream.

Figure 3:
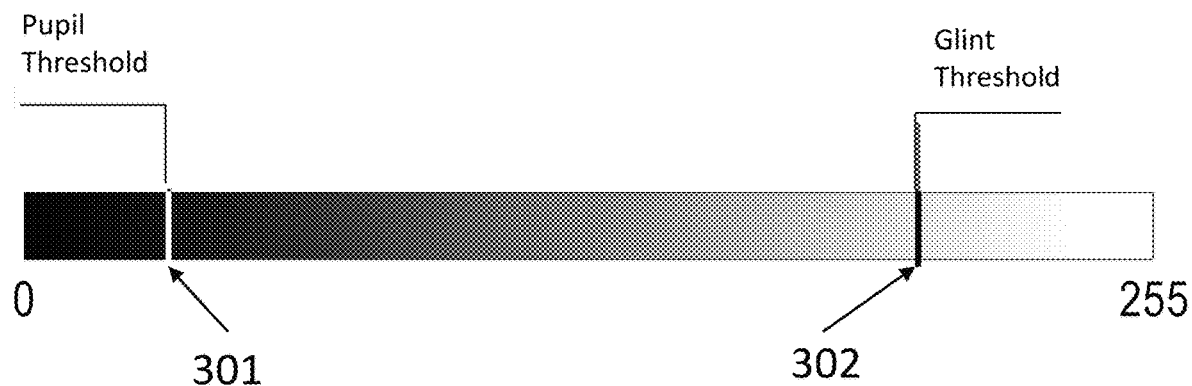
FIG. 3 illustrates a grey scale upon which a threshold of values relating to a pupil is indicated and a threshold of values relating to glints is indicated, in accordance with some embodiments.

FIG. 3 illustrates a grey scale upon which threshold of values relating feature regions are indicated. In particular, FIG. 3 shows a grey scale with a threshold value for a pupil region and a threshold value for a glint region. Pupils and glints are eye features of interest for eye-tracking, and thus define feature regions of the image 200. The grey scale includes pixel values between 0 and 255. The pre-processing subsystem 102 generates the grey scale from the (e.g., bit depth) image data generated by the optical sensor 101. The grey scale values are used to reduce the amount of bits associated with each pixel of the image 200. By using grey scale and assigning a threshold value 301 for the pupil and a threshold value 302 for glints, a pixel having a grey scale value from 0 to the threshold value 301 is considered a pupil pixel, and a pixel having a grey scale value from threshold level 302 to a grey scale value of 255 is considered a glint pixel. Pixels of all other grey scale values are considered background. As such, values between 301 and 302 are considered background. In various embodiments, a feature region may be defined by one or more threshold values, and an encoding can use one or more types of feature region (e.g., as is desirable, optimal, or sufficient for eye-tracking purposes).

Figure 4:
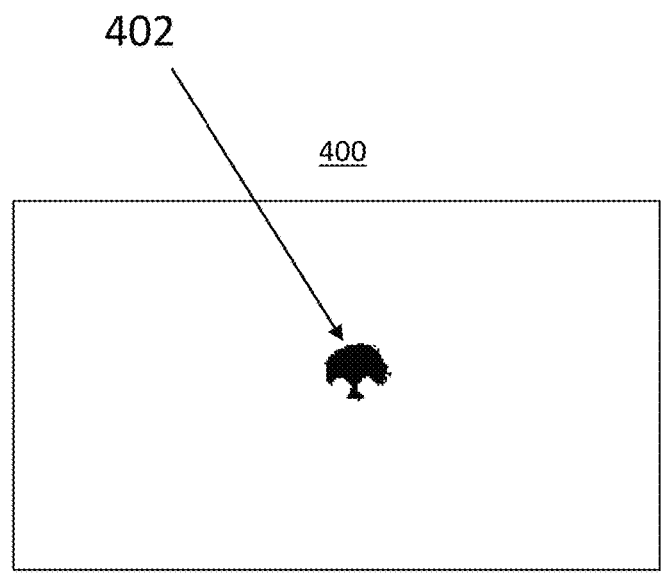
FIG. 4 illustrates the eye from FIG. 2 where the pupil threshold values are used to identify pixels of the pupil, in accordance with some embodiments.

Using, for example, a bit 1 to code pupil pixels and a bit 0 to code background pixels, the pre-processing subsystem 102 converts the image of Figure into the image 400 shown in FIG. 4, where the sensory area is all background except for a feature region of pupil pixels 402.

Figure 5:
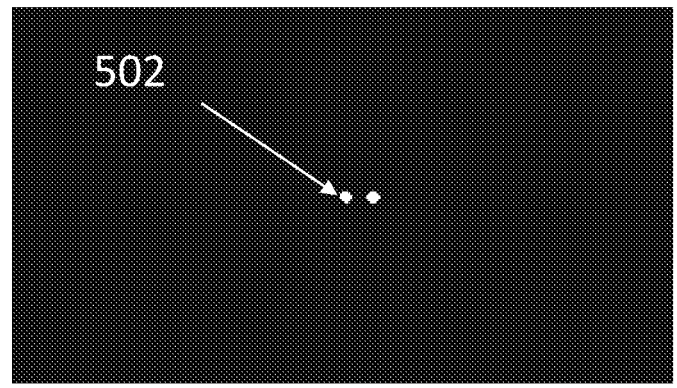
FIG. 5 illustrates the eye from FIG. 2 where the glint threshold values are used to identify pixels of the glints, in accordance with some embodiments.

Using a 0 or 1 to code glint pixels and the complementary bit (1 or 0) to code background, the pre-processing subsystem 102 generates an image result as in FIG. 5 where the image 500 is all background (black area) and the two glints are shown as two small white areas.

Figure 6:
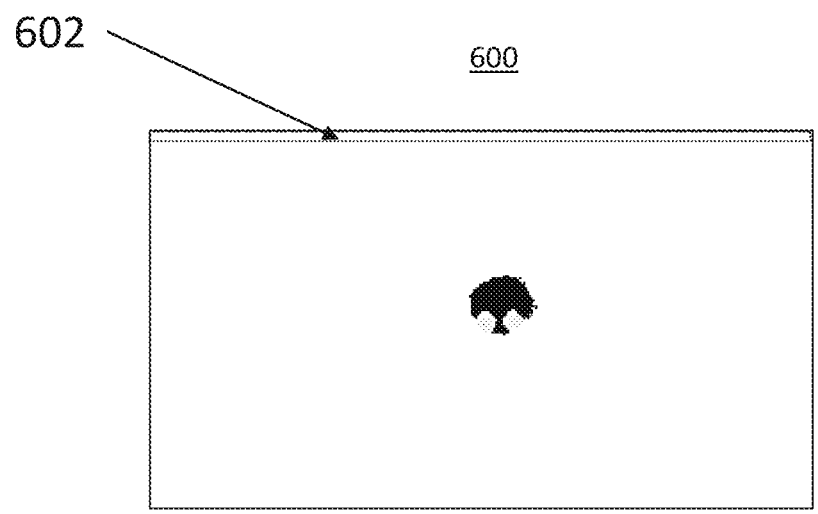
FIG. 6 illustrates the eye from FIG. 2 where the pupil and glint pixels are captured against a background of white using two binary bits, in accordance with some embodiments.

Using a two-bit scheme per pixel, the pre-processing subsystem 102 identifies each pixel as one of three pixel features—background, pupil and glint—as shown in FIG. 6. For example, the code '10' can be used to code the background, the code '01' can be used to code the glint pixels, and the code '00' can be used to code the pupil pixels of the image 600.

Figure 7:
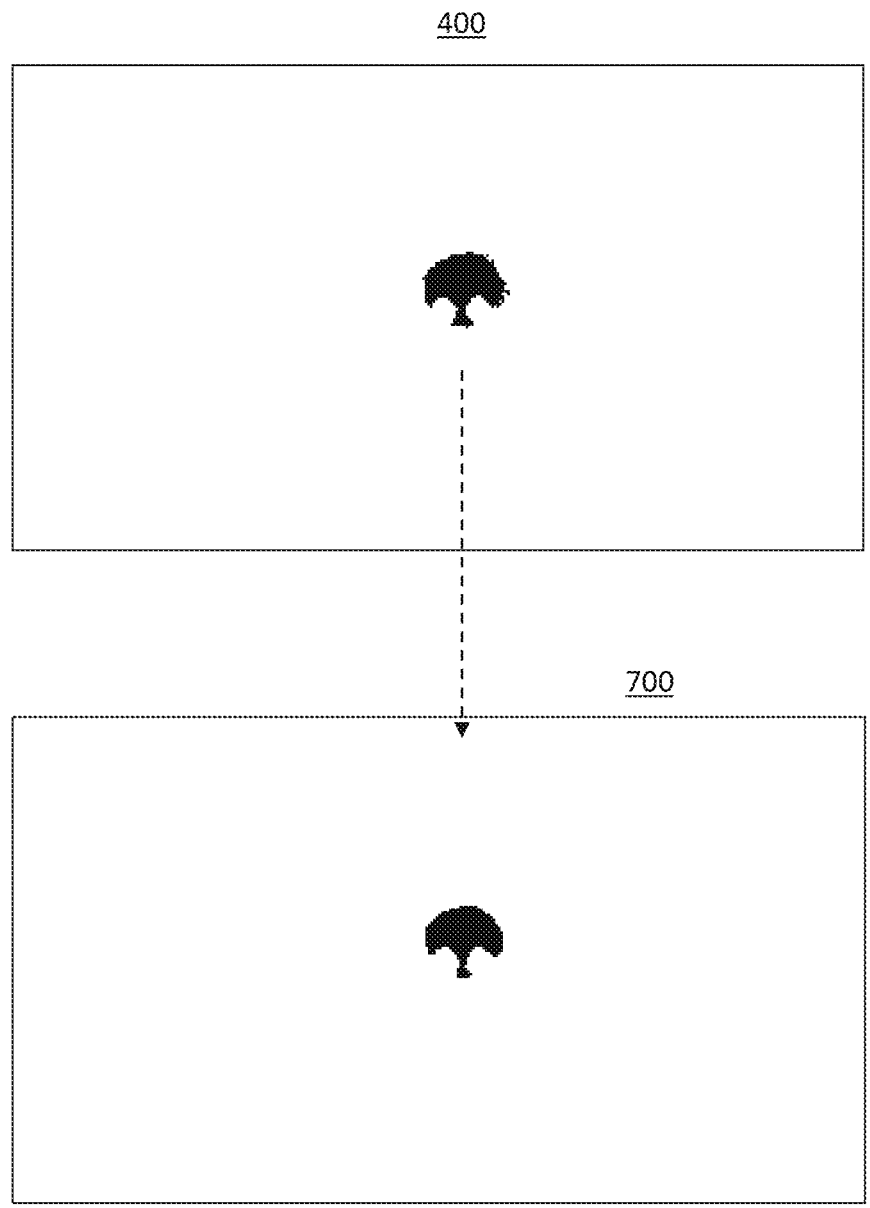
FIG. 7 illustrates cleaning of optical noise at a pupil region, in accordance with some embodiments.

FIG. 7 illustrates a cleaning of optical noise at a pupil region. The image 400 of the pupil pixels (e.g., also shown in FIG. 4) may be optically noisy. Using a (e.g., morphological) filter, the pre-processing subsystem 102 assigns pixels of noise to the background region leaving a more noise-free pupil image 700.

As discussed above, pixels of non-feature regions may be unnecessary for eye-tracking. Because it may require a large frame buffer memory to store data for pixels of non-feature regions, or a large connection bandwidth to transmit data for pixels of non-feature regions, an encoding can be performed that encodes pixels of feature regions (or contours between feature and non-feature regions). Since pixels outside the pupil and glint regions are of no interest for subsequent operations, there is no need to represent these non-feature regions as traditional image data, that is, by pixel data values for each pixel. In some embodiments, an on-the-fly run length encoding technique can be used that runs on the pre-processing subsystem 102 and transmits a reduced dataset. For example, the encoding technique may use one or more encoding formats that represent pixel values of pixels of feature regions more efficiently (e.g., in terms of data size) than using unencoded pixel values for the pixels of the feature regions.

Run-Length Encoding

FIG. 8 illustrates a run-length encoding using 2 bits to distinguish between pupil, glints and background. The pre-processing subsystem 102 may encode image data from the optical sensor subsystem 101 using a run-length encoding. A run-length encoding format refers to an encoding format that uses one or more bits to define a region (e.g., pupil, glint, or background), and additional bits to define a run length of one or more pixels assigned to the region. A run-length encoding converts the pixel values of pixels of the image data into blocks defined by a run-length encoding format. A run-length encoding format may have a predefined bit length. As such, a data stream output from the pre-processing subsystem 102 to the host system 104 can include sequential blocks of data encoded in the run-length encoding format. The run-length encoding format of FIG. 8 has a 16 bit length per block, for example. The run-length encoding formats discussed herein can include various bit lengths.

As shown in the run-length encoding format of FIG. 8, three different threshold values for pupil, glint and background can be encoded with two bits: '00' for pupil, '01' for glints and '10' for background, for example. Using the run-length encoding format having 16 bits makes it possible to encode a sequence of pixels (e.g., assigned to the same feature region) by storing the bit value for the region in the most significant two bits, and the length of the run in the least significant 14 bits. This results in the 14 bits defining runs up to 16384 ($2^{14}$) pixels in length. The bit length of a run-length encoding format may be configured to minimize or reduce the number of runs (e.g., on average) used to define the image data as encoded image data. For example, lower frequencies of transition between feature and non-feature regions can be efficiently encoded by using run-length encoding formats of larger bit size. In contrast, an image with high frequencies of transition between feature and non-feature regions results in more runs of shorter length. Here, shorter run-length encoding formats may more efficiently encode the image data because the (e.g., 14) bits used to describe the run length may be larger than optimal. As discussed above in connection with FIG. 7, a noise filtering can be used to reduce optical noise which can otherwise cause more transitions between feature and non-feature regions.

In the example image 600 shown in FIG. 6, the topmost row line 602 may include 300 background pixels. Therefore, line 602 would be represented as 1000000100101100 using the 16 bit run-length encoding format of FIG. 8, with the most significant bits "10" defining the background region, the other 14 bits "00000100101100" representing the 300 pixel run length of the background region. The run-length encoding is more data size efficient than unencoded image data, or other types of encoding schemes. If the 300 pixels of the line 602 are each encoded using 8-bit pixels, 2400 bits would be needed to represent the line 602. If the 300 pixels of the line 602 are each encoded using 2-bit pixels, 600 bits would be needed to represent the line 602. The run-length encoding allows the line 601 to be represented in 16 bits of data, while providing same amount of information in terms of eye-tracking analysis.

FIG. 9 illustrates a run-length encoding using 1 bit to distinguish between feature regions (glints or pupil) and non-feature regions (background), in accordance with some embodiments. The run-length encoding format of FIG. 9 differs from the format of FIG. 8 in that a single bit rather than two bits is used to distinguish between feature regions and non-feature regions, such as the background. As discussed above in connection with FIG. 8, if an encoding scheme is used where '00' represents a pupil pixel, '01' represents a glint pixel, and '10' represents a background pixel, then the most significant bit differentiates between either non-feature regions (e.g., background or one of the other threshold values) or feature regions (e.g., the pupil or glint). The run-length encoding for background values can be modified so that a 1 in the most significant bit of the run-length encoding format means that the run corresponds to a non-feature region, such as the background in this example. The next remaining 15 bits can then be used to define the length of the run, which can now go up to 32,768 pixels ($2^{15}$). Although the run-length encoding formats of FIG. 8 and FIG. 9 each include 16 bits, the non-feature region can have an extra bit to encode a larger run length of pixels when 15 bits are used rather than 14 bits (e.g., defining a max length of 16,384 pixels).

Allocating one or more additional pixels of a run-length encoding format for a non-feature region (e.g., background) potentially provides better compression for very large images and/or images including mostly background regions. Using a 1 bit code for a spatially dominant region in captured images, which may in some examples be a feature region rather than the background regions, allows for larger runs of the region to be encoded within a block and reduces the overall size of the encoded image data.

In some embodiments, a run-length encoding can be applied directly on the full bit-depth image 200 received from the sensor. That is, it is not necessary to create a 2-bit image (e.g., image 400 shown in FIG. 4) before applying the run-length encoding.

Figure 10:
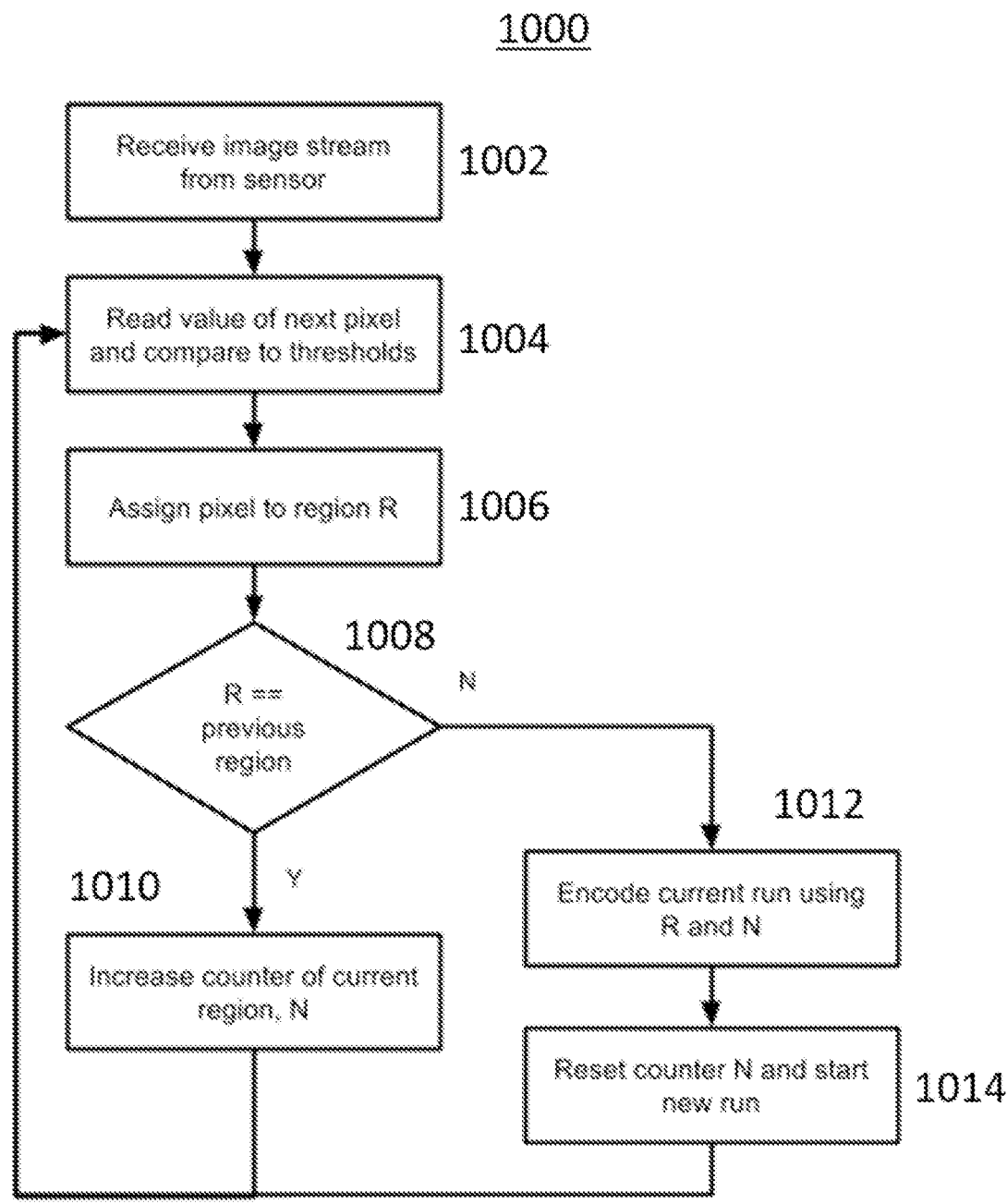
FIG. 10 illustrates a flow diagram of a process for run-length encoding an image stream generated by a sensor, in accordance with some embodiments.

FIG. 10 illustrates a flow diagram of a process 1000 for run-length encoding an image stream generated by a sensor. The process 1000 may be performed by the system 100 in some embodiments. Alternatively, other components may perform some or all of the steps of the process 1000. In process 1000, a run-length encoding algorithm is used to encode and transmit pupil and glint information.

A stream of image data captured by the sensor subsystem 101 is received 1002 by the pre-processing subsystem 102. The sensor subsystem 101 generates the stream of image data based on capturing light reflected from the eye of the user. The stream of image data includes pixel values for a sequence of pixels that define the image.

Each pixel value is read and compared 1004 to one or more thresholds for regions of interest, such as the pupil and glint thresholds. The pre-processing subsystem 102 may also perform noise reduction and 2 bit-encoding on the image prior to comparison with the thresholds. The comparison can be performed in real-time for each pixel as pixel values for the pixel are received from the sensor subsystem 101 in the stream of image data.

The pre-processing subsystem 102 assigns 1006 a pixel to a region R based on the comparison of pixel values of the pixel and the one or more thresholds. The region R may be a feature region (e.g., pupil, glint, etc.) or a non-feature region (e.g., background).

The pre-processing subsystem 102 determines 1008 whether the region R is the same region as the region stored for a previous pixel. The previous pixel may refer to a pixel defined by pixel values of a pixel previously received prior to the pixel values of the current pixel assigned to the region R, or a pixel that is otherwise determined to be adjacent to the current pixel in the image.

If the region R is the same as the region stored for the previous pixel, the pixel belongs to the current run, and the pre-processing subsystem 102 increases 1010 a counter N defining the length of the current run. Process 1000 returns to 1004, where a next pixel is read from the stream of image data received from the sensor subsystem 101.

Returning to 1008, if the region R is different than the stored region of the previous pixel, the previous run of the previous pixel has ended and a new run is initiated for the current pixel. In response to determining that the previous run has ended, the pre-processing subsystem 102 encodes 1012 the run using the region information and the value of counter N of the run. The run may be encoded using a run-length encoding format. In some embodiments, only runs for feature regions are encoded using the run-length encoding format. After a run is encoded, the pre-processing subsystem 102 may transmit the bit values of the run as encoded image data to the host system 104.

The pre-processing subsystem 102 then resets 1014 the counter N for the new run. Process 1000 returns to 1004, where a next pixel is read from the stream of image data received from the sensor subsystem 101.

In some embodiments, the pre-processing subsystem 102 may also forward information about the average gray level of the region R, which can be used by the control subsystem 103 and/or host system 104 to determine the optimal pupil threshold. That can be done by adding 8 extra bits to the run-length encoding format. A run-length encoding format can be extended by one or more bits to encode the average grey level. For example, the run-length encoding format having 16 bits shown in FIG. 9 can be increased by 8 bits to encode the average gray level of the current run, resulting in 24 total bits per block.

In some embodiments, the iris region is also encoded and transmitted. The iris region may be another example of a feature region. Additional bits of an encoding format may be used to define the region to distinguish between more types of regions. In this case, the two most significant bits are used to encode four possible regions, that is, pupil, glint, iris or background. For example, an encoding scheme may be used where '00' represents a pupil pixel, '01' represents a glint pixel, '10' represents a background pixel, and '11' represents an iris pixel. An iris region may be defined by two gray thresholds higher than the pupil threshold and lower than the glint threshold. A pixel with a gray value within the iris min and max thresholds can be considered as belonging to the iris region.

In the case of processed images where noise is present, very short runs of dark pixels that are considered to be part of the pupil may occur. As an example, small objects can be seen around the pupil object 402 in FIG. 4. These small objects constitute very short runs, and hence most of the 14 least significant bits would be zero. In addition or alternative to using noise filtering to reduce the occurrence of noise pixels, an alternative run-length encoding format can be used. An alternative run-length encoding refers to a run-length encoding that uses multiple run-length encoding formats of different bit length. One or more bits of an alternative run-length encoding are used to define the bit length of the run. The bit length of a run can be selected based on the pixel length of the run.

Figure 11:
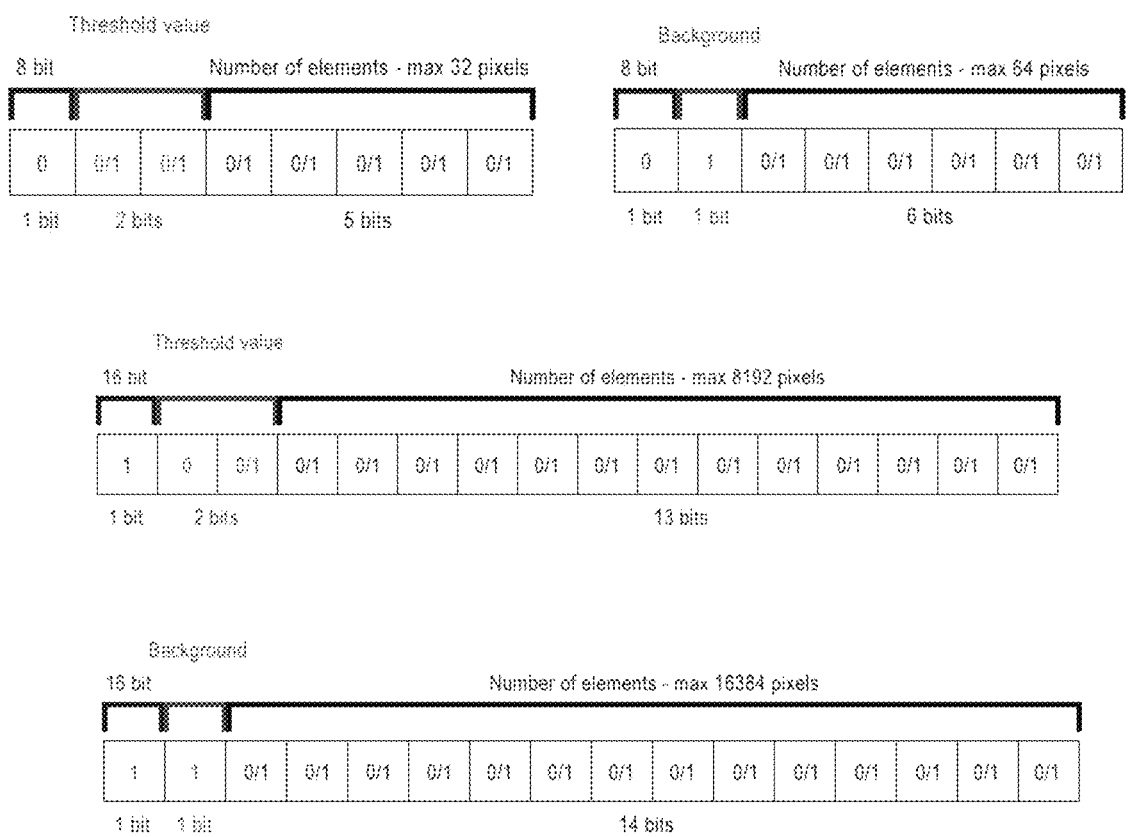
FIG. 11 illustrates an alternative run-length encoding to reduce the data from an image stream generated by a sensor, in accordance with some embodiments.

In some embodiments, an alternative run-length encoding scheme uses runs described in 8 bits (1 byte), as well as the runs described in 16 bits. FIG. 11 illustrates an alternative run-length encoding to reduce the data from an image stream generated by a sensor. In this example, the most significant bit is used to differentiate encoded runs of different bit length. For example, the most significant bit is used to differentiate between the 8-bit encoding format and the 16-bit encoding format as shown in FIG. 11. The next most significant one or more bits define the region, such as pupil, glint or background region. The remaining last significant bits may define the pixel length of the run. For 8-bit encoded runs, and after 3 bits have been used to define the bit length and region, the remaining 5 least significant bits denote the length of the run. The length of the run can be up to 32 ($2^5$) pixels for pupil and glint regions when represented by the 5 bits. In the case where the region is background, an additional bit may be allocated from defining the region to defining the run length. Here, the 6 least significant bits are used for the 8-bit encoded run, and hence the run for the background region can be up to 64 ($2^6$) pixels long.

For 16-bit encoded runs, and after 3 bits have been used to define the bit length and region, the length of the run is determined by the remaining 13 least significant bits. Hence, the length of a run in this case can be up to 8192 ($2^{13}$) pixels. As described, background region pixels can be encoded with only 1 bit, and therefore the length of a background run can be up to 16384 ($2^{14}$) pixels using 14 least significant bits.

This alternative run-length encoding technique ensures that pixel runs lower than 32 pixels will take maximum 1 byte of space to encode, compared to the 2 bytes they would be used without alternative run-length encoding.

Figure 12:
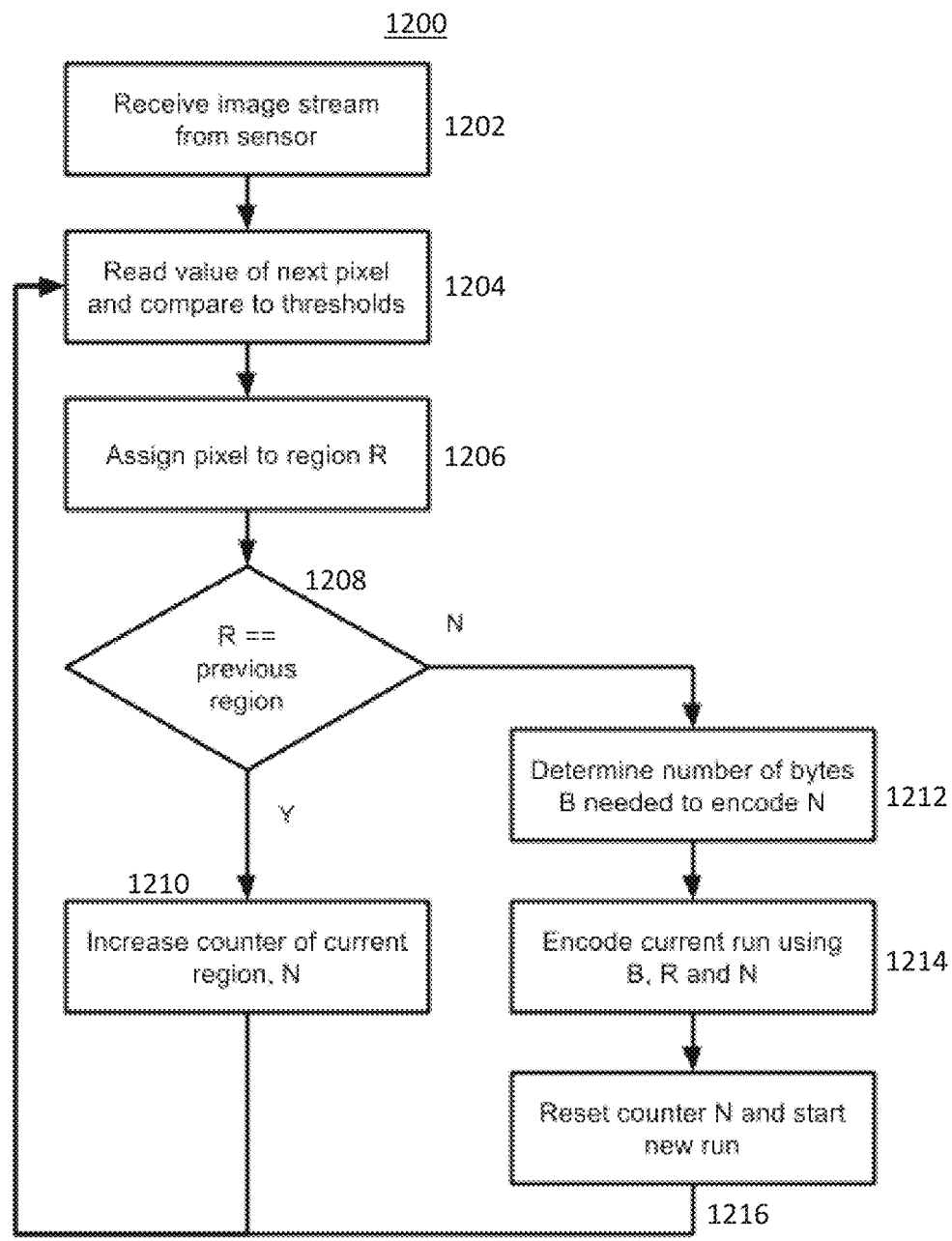
FIG. 12 illustrates a flow diagram of a process for alternative run-length encoding as depicted in Figure for of an image stream of a sensor, in accordance with some embodiments.

FIG. 12 illustrates a flow diagram of a process 1200 for alternative run-length encoding as depicted in FIG. 11 for an image stream of a sensor. The process 1200 may be performed by the system 100 in some embodiments. Alternatively, other components may perform some or all of the steps of the process 1200.

A stream of image data generated by the sensor subsystem 101 is received 1202 by the pre-processing subsystem 102. The pre-processing subsystem 102 reads and compares 1204 each pixel value in the stream of image data to one or more thresholds for regions of interest, such as the pupil and glint thresholds.

The pre-processing subsystem 102 assigns 1206 a pixel to a region R based on the comparison of pixel values of the pixel and the one or more thresholds. The region R may be a feature region (e.g., pupil, glint, etc.) or a non-feature region (e.g., background).

The pre-processing subsystem 102 determines 1208 whether the region R is the same region as the region stored for a previous pixel. If the region R is the same as the region stored for the previous pixel, the pixel belongs to the current run, and the pre-processing subsystem 102 increases 1210 the counter N defining the length of the current run. Process 1200 returns to 1204, where a next pixel is read from the stream of image data received from the sensor subsystem 101.

Returning to 1208, if the region R is different from the stored region of the previous pixel, the previous run has ended. In response to determining that the previous run has ended, the pre-processing subsystem 102 determines 1212 how many bytes B (or bits b) are necessary to encode the run depending on its length as defined by counter N and the region R. The needed bytes B or bits b can be determined based on the equation $2^b=N$.

The run is then encoded 1214 using the byte length information B, the region information R and the length N of the run. For example, if the region R is a feature region, then 2 bits may be used to encode the feature region and 1 bit may be used to define the selected alternative run-length format (e.g., 8-bits or 16-bits of the alternative run-length encoding shown in FIG. 11). These 3 bits are added to a bit length defined by B to determine a total needed bit length to define the run. If the total bit length exceeds the 8-bit encoding format in FIG. 11, then the 16 bit encoding format may be used to encode the run.

In another example, if the region R is a non-feature region, then 1 bit may be used to encode the feature region and 1 bit may be used to define the selected alternative run-length format (e.g., 8-bits or 16-bits of the alternative run-length encoding shown in FIG. 11). These 2 bits are added to a bit length defined by B to determine a total needed bit length to define the run. If the total bit length exceeds the 8-bit encoding format in FIG. 11, then the 16 bit encoding format may be used to encode the run. If the total bit length is less than or equal to 8-bit, then the 8-bit encoding formal may be used.

After the run is encoded, the pre-processing subsystem 102 may transmit the bit values of the run as encoded image data to the host system 104. In some embodiments, only runs for feature regions are encoded using an alternative run-length encoding format.

The pre-processing subsystem 102 then resets 1216 the counter N for the new run. Process 1200 returns to 1204, where a next pixel is read from the stream of image data received from the sensor subsystem 101.

In some embodiments, a run-length encoding may be applied only to feature regions. Pixel information about non-feature regions, such as background regions, not needed for eye tracking purposes. Thus pixels of non-feature regions can be not encoded in a run-length encoding.

Figures 13, 14:
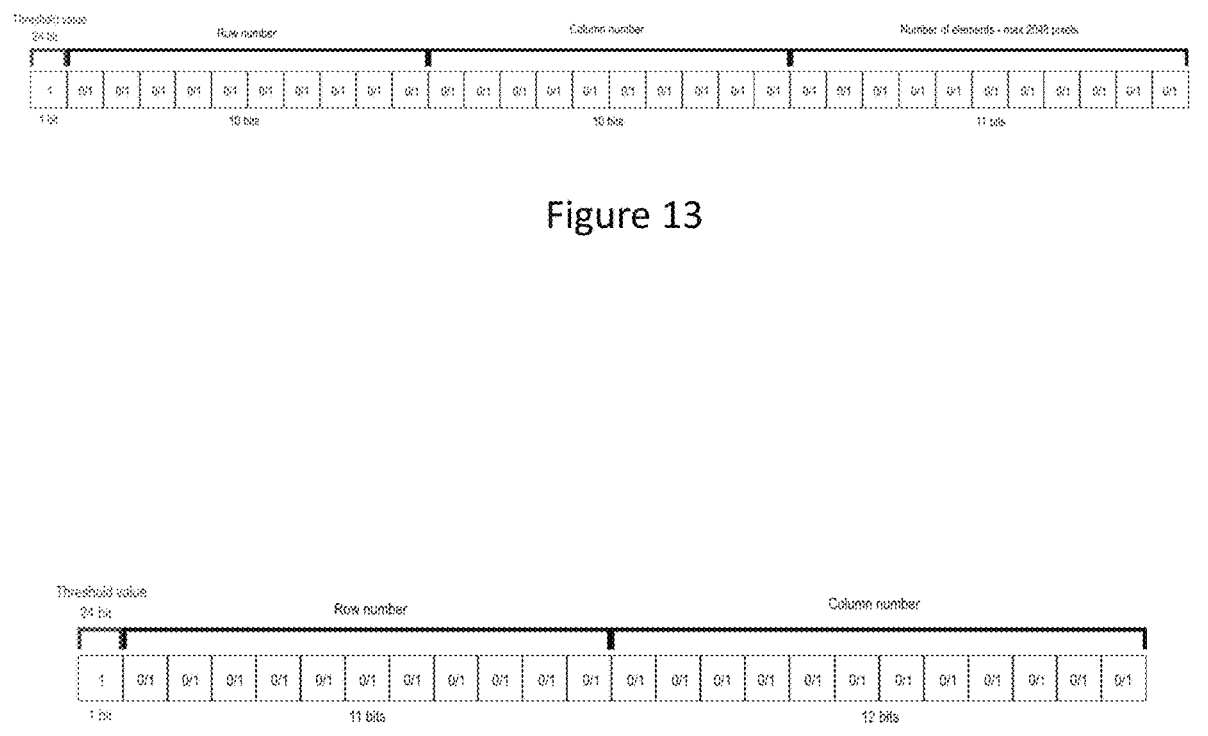

FIG. 13 illustrates a run-length encoding for feature regions. In this example, the run-length encoding uses 32 bits to define feature regions, such as pupil or glint regions. The most significant bit is used to indicate the feature region type, such as whether the run is a pupil or a glint run. The following 10 bits are used to encode the row number, such as the y coordinate of the pixel defining the beginning of the run. The next 10 bits are used to encode the column, such as the x coordinate of the pixel defining the beginning of the run. The remaining 11 bits are used to encode the length of the run.

Run-length encoding of feature pixels (pupil or glints) provides efficient encoding and transmission of the image data relevant to further steps in an eye tracking algorithm. Multiple adjacent pixels of the same region (e.g., pupil, the glints, or the background) may be encoded as a run rather than as individual pixel values. This process can be done in real time without the need to buffer the image or parts of the image. That is, the runs are encoded and transmitted as the image data stream is received from the sensor.

Contour Encoding

In some embodiments, a contour encoding is used rather than a run-length encoding to generate encoded image data from image data. Here, the contour pixels of one or more feature regions (e.g., pupil or glint) are encoded in a contour encoding format. Pixels of non-contour regions are not encoded. These non-contour regions include background regions, as well as non-contour pixels of feature regions. The contour encoding only encodes and transmits the contour points of feature regions, such as the pupil and glint regions. Here, pixels assigned to background regions and non-contour pixels of feature regions are not encoded as part of an output data stream.

FIG. 14 illustrates a contour encoding for a feature region. In a contour encoding, each contour pixel of a feature region is encoded using one or more bits to define the feature region, multiple bits are used to define a row number of the contour pixel, and multiple bits are used to define the column number for the contour. For example, FIG. 14 shows a contour encoding that encodes pupil or glint contours using 24 bits. Each contour pixel is encoded using 24 bits. The most significant bit is used to define the feature region, such as to distinguish between pupil and glint contours. The next 11 bits are used to encode the row number, such as the y coordinate of the contour point, and the remaining 12 bits are used to encode the column number, such as the x coordinate of the contour point.

By specifying the row number of each contour pixel, it is not necessary to transmit information about background runs. Hence, only relevant information concerning contour pixels is encoded and transmitted.

Figure 15:
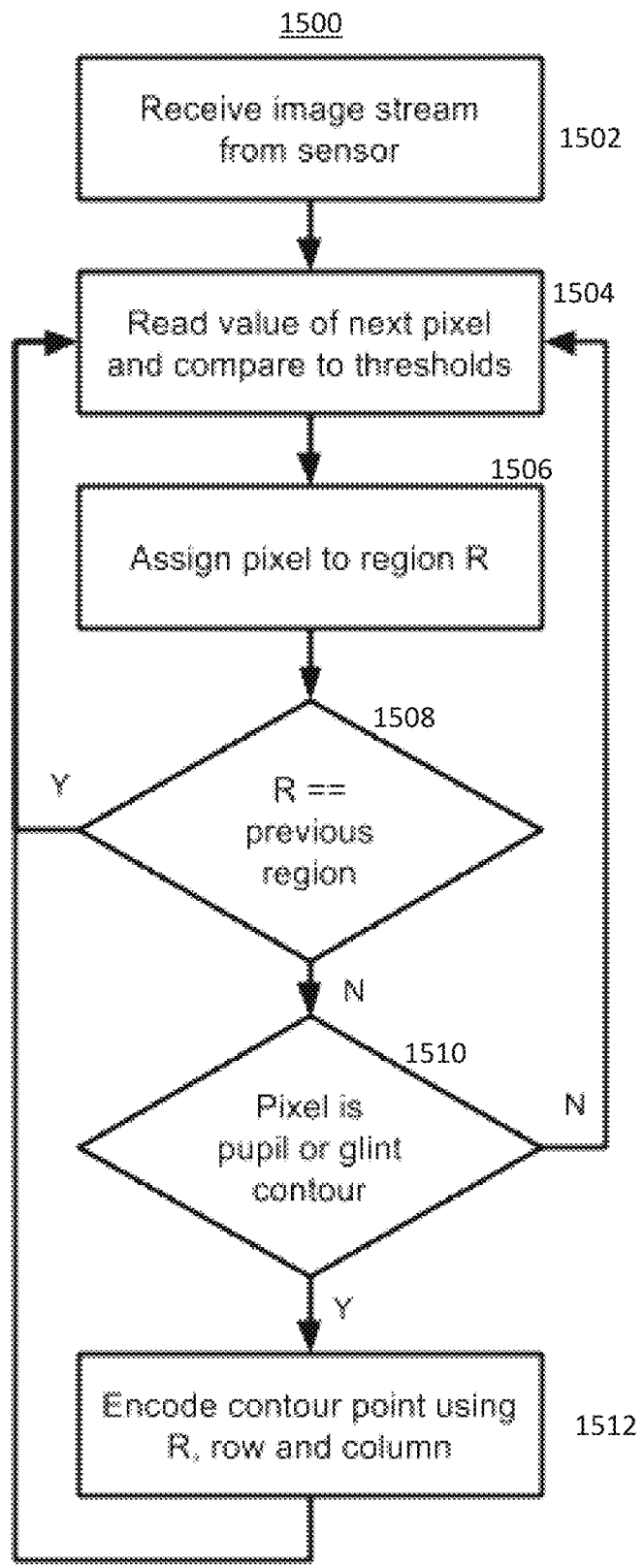
FIG. 15 illustrates a flow diagram of a process for applying contour encoding to an image stream generated by a sensor, in accordance with some embodiments.

FIG. 15 illustrates a flow diagram of a process 1500 for applying contour encoding to an image stream generated by a sensor. The process 1500 may be performed by the system 100 in some embodiments. Alternatively, other components may perform some or all of the steps of the process 1500.

The pre-processing subsystem 102 receives 1502 a stream of image data generated by the sensor subsystem 101. The pre-processing system 102 reds and compares 1504 each pixel value in the stream of image data to one or more thresholds for regions of interest, such as the pupil and glint thresholds that define feature regions.

The pre-processing subsystem 102 assigns 1506 a pixel to a region R (pupil, glint, background) based on the comparison of pixel values of the pixel and the one or more thresholds.

The pre-processing subsystem 102 determines 1508 whether the region R of the pixel is the same as the region R stored for a previous pixel. If the region R for the current pixel is the same as the region stored for the previous pixel, the pixel is not a contour point, and the process 1500 returns to 1504, where pre-processing subsystem 102 reads and compares the next pixel with the one or more thresholds.

If the region R assigned to the current pixel is different from the region of the previous pixel, the pixel is a contour pixel. In response to determining that the pixel is a contour pixel, the pre-processing subsystem 102 determines 1510 whether the pixel belongs to a contour of a feature region, such as a pupil or a glint contour. For example, if the previous pixel was a background pixel and the current pixel is a pupil or glint region pixel, then the current pixel is determined as a pupil or glint contour, respectively. In another example, if the previous pixel was a pupil pixel, and the current pixel is a glint region pixel, the current pixel is determined as a glint contour.

If the pixel belongs to a feature region contour (e.g., pupil or glint contour), the pre-processing subsystem 102 encodes 1512 the contour pixel information using the information about the region R, and the location of the pixel on the image (e.g., the row and column number). For example, the contour encoding format shown in FIG. 14 may be used to encode the region R with the most significant bit, the row number with the next 11 bits, and the column number with the remaining 12 bits.

In some embodiments, it may be advantageous to include the region corresponding to the iris, so that its contour (the border between iris and sclera) can be encoded as well. In this case, the 2 most significant bits may be used to encode the feature region (iris, pupil or glint), and the remaining bits are used to code the row and column numbers. For example, the contour encoding format shown in FIG. 14 may be modified such that the 2 most significant bits encode the contour region, the next 11 bits to encode the row number, and the remaining 11 bits encode the column number.

After the run is encoded, the pre-processing subsystem 102 may transmit the bit values of the run as encoded image data to the host system 104. Process 1500 returns to 1504, where a next pixel is read from the stream of image data received from the sensor subsystem 101.

In some embodiments, it may be advantageous to have information about the difference in gray level between a contour point of a feature region and a pixel outside the feature region (e.g., in the background region). This information can be used by the control subsystem 103 and/or host system 104 to determine whether the threshold values for pupil, glint and/or iris regions are optimal. In this case, 8 more bits may be added to the contour encoding format shown in FIG. 14 to encode the gray level.

In some embodiments, the pre-processing subsystem 102 may determine whether a contour pixel should be encoded and transmitted based on some basic prior information. For instance, a transition between a glint and a pupil region may be due to the glint falling on the pupil, as shown in FIG. 2. This causes the pupil contour to be deformed, as shown in FIG. 4. When the pre-processing subsystem 102 detects that transition between glint region and pupil region, it may skip encoding of the pupil contour pixel.

Image Data and Encoded Image Data Interlacing

In some embodiments, the control subsystem 103 or host system 104 can configure the pre-processing subsystem 102 to not apply certain image processing techniques for one or more frames of image data generated by the optical sensor subsystem 101. In particular, the control subsystem 103 or host system 104 can disable bit-depth reduction using run-length or contour encoding, and hence the pre-processing subsystem 102 may provide a standard, full bit depth image. The full depth image refers to raw image data as generated by the optical sensor subsystem 101. The control subsystem 103 or host system 104 can apply image processing algorithms to the image data to determine the optimal value for the parameters of the image processing techniques that are run by the pre-processing subsystem 102. This may include values for the feature region thresholds, sizes of a kernel for morphological operations, and the like. The control subsystem 103 or host system 104 may then instruct the pre-processing subsystem 102 to encode subsequent frames image data captured by the optical sensor subsystem 101 using updated thresholds and values. The pre-processing subsystem 102 uses configuration controls from the control subsystem 103 or host system 104 to encode the image data using the run-length encoding or contour encoding as discussed herein to reduce the amount of data being transferred between the optical sensor subsystem 101 and the host system 104.

In some embodiments, the pre-processing subsystem 102 sends uncompressed image to the control subsystem 103 or host system 104 to facilitate determination of optimal values and thresholds use in encoding. Sending an uncompressed image, particularly to the host system 104, will decrease the rate of encoded image data transmission and increase latency. In other embodiments, the threshold values are predefined and updated by the control subsystem 103 which does so by performing statistical analysis of the output of the object labelling algorithm. The pupil object is either dark when using off-axis illumination, or bright with on-axis illumination, has an elliptical shape, and a well-defined range for minimum and maximum size. Given this information the control subsystem 103 issues a ranged threshold sweep to identify the values which produce a best fit, for example, an object that has a size within an expected range size and/or a circular shape. The benefit of this approach is that no uncompressed image data is transferred beyond the pre-processing subsystem 103, such as to the host system 104. Given a high frame rate system the ideal threshold(s) can be found within a very brief amount of time.

In some embodiments, the pre-processing subsystem 102 is configured to transmit the full bit depth image at a certain time interval while maintaining high refresh rates for the compressed and encoded data stream. The control subsystem 103 computes the parameters for the algorithms used by the pre-processing subsystem 102 based on the uncompressed image data received at those time intervals, and updates the values on the pre-processing subsystem 102 accordingly.

Figure 16:
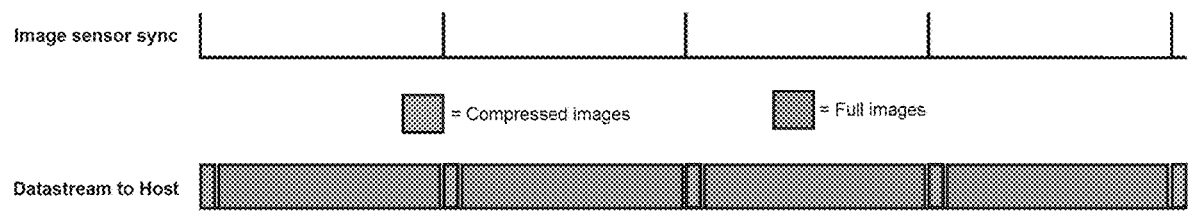
FIG. 16 illustrates a synchronization of image sensor data such that a mix of uncompressed and compressed pixel data can be sent to a host processor, in accordance with some embodiments.

FIG. 16 illustrates a synchronization of image sensor data such that a mix of unencoded and encoded (and thus compressed) pixel data can be sent to a host system 104. The full bit-depth image data can be transmitted in chunks in between the encoded image data via the compressed data stream in order to not interrupt the flow of the optimized, encoded images. The full image data is thus interleaved with encoded image data in the data stream output to the host system 104. This prevents latency in the feature detection and ensures that the control subsystem 103 and/or host system 104 has at least one full bit depth image available if needed.

In some embodiments, the host system 104 uses the compressed image data for event detection (saccades or fixations) with low latency and uses a periodic transmission of full bit depth images to compute the eye features, thresholds, calibration, etc.

In some embodiments, the pre-processing subsystem 102 may determine that the frame does not contain enough information to represent a useful eye image, and may in consequence set a control flag that signals the control subsystem 103 to not process the remaining pixels of the frame. This can include not encoding of any pixels of the frame, or not transmitting encoded pixels of the frame to the host system 104. For example, these criteria could be that the sensor data for the current frame does not contain enough pupil or glint pixels; or does not contain a continuous segment that would constitute a valid image with eye features. This effectively allows the pre-processing subsystem 102 to abort the given frame with an early-out mechanism without the control subsystem 103 and/or host system 104 having to receive or process any data for the image frame.

In some embodiments, the control subsystem 103 determines the location and size of the eye regions, and forwards this information to the pre-processing subsystem 102. The pre-processing subsystem 102 then uses this information to only transfer that region or regions of subsequent images to the control subsystem 103. This operation can therefore limit the size of the image in terms of amount of pixels, and can be done on both uncompressed and compressed images. The active sensor readout area may remain unchanged.

Example HMD System

FIG. 17 is system 1700 in which a HMD 1705 operates. The system 1700 may be for use as a virtual reality (VR) system, an augmented reality (AR) system, a mixed reality (MR) system, or some combination thereof. In this example, the system 1700 includes a HMD 1705, an imaging device 1710, and an input interface 1715, which are each coupled to a console 1720. While FIG. 17 shows a single HMD 1705, a single imaging device 1710, and a single input interface 1715, in other embodiments, any number of these components may be included in the system. For example, there may be multiple HMDs 1705 each having an associated input interface 1715 and being monitored by one or more imaging devices 1710, with each HMD 1705, input interface 1715, and imaging devices 1710 communicating with the console 1720. In alternative configurations, different and/or additional components may also be included in the system 1700. The HMD 1705 may act as a VR, AR, and/or a MR HMD. An MR and/or AR HMD augments views of a physical, real-world environment with computer-generated elements (e.g., images, video, sound, etc.).

As discussed above, the system 100 of FIG. 1 may be part of a system including an HMD, such as the system 1700 including the HMD 1705. In some embodiments, the optical sensor subsystem 101, pre-processing subsystem 102, and control subsystem 103 may be part of the HMD 1705, while the host system 104 may be part of the console 1720. In other embodiments, the host system 104 is also incorporated within the HMD 1705 as a circuitry separate from the optical sensor subsystem 101, pre-processing subsystem 102, and control subsystem 103.

The HMD 1705 presents content to a user. Example content includes images, video, audio, or some combination thereof. Audio content may be presented via a separate device (e.g., speakers and/or headphones) external to the HMD 1705 that receives audio information from the HMD 1705, the console 1720, or both. The HMD 1705 includes an electronic display 1755, a multifocal structure 1760, an eye tracking module 1725, a vergence processing module 1730, one or more locators 1725, an internal measurement unit (IMU) 1775, head tracking sensors 1735, and a scene rendering module 1740.

The multifocal structure 1760 adjusts its focal length responsive to focus instructions from the console 1720. The focus instructions may be generated based on eye tracking information. The eye tracking information is determined from the encoded image data generated at the pre-processing subsystem 102.

The eye tracking module 1725 tracks an eye position and eye movement of a user of the HMD 1705. The eye tracking module 1725 may be part of the host system 104. The eye tracking module 1725 is in the HMD 1705 in FIG. 17, but may be located at the console 1720. The optical sensor subsystem 101 inside the HMD 1705 captures image information of a user's eyes, and eye tracking module 1725 uses the captured information to determine interpupillary distance, interocular distance, a three-dimensional (3D) position of each eye relative to the HMD 1705 (e.g., for distortion adjustment purposes), including a magnitude of torsion and rotation (i.e., roll, pitch, and yaw) and gaze directions for each eye. In one example, infrared light is emitted within the HMD 1705 and reflected from each eye. The reflected light is received or detected by the camera and analyzed to extract eye rotation from changes in the infrared light reflected by each eye. Many methods for tracking the eyes of a user can be used by eye tracking module 1725. Accordingly, the eye tracking module 1725 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 1725 integrates information from past measurements, measurements identifying a position of a user's head, and 3D information describing a scene presented by the electronic display 1765. Thus, information for the position and orientation of the user's eyes is used to determine the gaze point in a virtual scene presented by the HMD 1705 where the user is looking.

The vergence processing module 1730 determines a vergence depth of a user's gaze based on the gaze point or an estimated intersection of the gaze lines determined by the eye tracking module 1725. The vergence processing module 1730 may be part of the host system 104. The vergence processing module 1730 is in the HMD 1705 in FIG. 17, but may be located at the console 1720. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 1730 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 1770 are objects located in specific positions on the HMD 1705 relative to one another and relative to a specific reference point on the HMD 1705. A locator 125 may be a light emitting diode (LED), a corner cube reflector, a reflective marker, a type of light source that contrasts with an environment in which the HMD 1705 operates, or some combination thereof. Active locators 1770 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 1770 can be located beneath an outer surface of the HMD 1705, which is transparent to the wavelengths of light emitted or reflected by the locators 1770 or is thin enough not to substantially attenuate the wavelengths of light emitted or reflected by the locators 1770. Further, the outer surface or other portions of the HMD 1705 can be opaque in the visible band of wavelengths of light. Thus, the locators 1770 may emit light in the IR band while under an outer surface of the HMD 1705 that is transparent in the IR band but opaque in the visible band.

The IMU 1775 is an electronic device that generates fast calibration data based on measurement signals received from one or more of the head tracking sensors 1735, which generate one or more measurement signals in response to motion of HMD 1705. Examples of the head tracking sensors 1735 include accelerometers, gyroscopes, magnetometers, other sensors suitable for detecting motion, correcting error associated with the IMU 1775, or some combination thereof. The head tracking sensors 1735 may be located external to the IMU 1775, internal to the IMU 1775, or some combination thereof.

Based on the measurement signals from the head tracking sensors 1735, the IMU 1775 generates fast calibration data indicating an estimated position of the HMD 1705 relative to an initial position of the HMD 1705. For example, the head tracking sensors 1735 include multiple accelerometers to measure translational motion (forward/back, up/down, left/right) and multiple gyroscopes to measure rotational motion (e.g., pitch, yaw, and roll). The IMU 1775 can, for example, rapidly sample the measurement signals and calculate the estimated position of the HMD 1705 from the sampled data. For example, the IMU 1775 integrates measurement signals received from the accelerometers over time to estimate a velocity vector and integrates the velocity vector over time to determine an estimated position of a reference point on the HMD 1705. The reference point is a point that may be used to describe the position of the HMD 1705. While the reference point may generally be defined as a point in space, in various embodiments, a reference point is defined as a point within the HMD 1705 (e.g., a center of the IMU 1775). Alternatively, the IMU 1775 provides the sampled measurement signals to the console 1720, which determines the fast calibration data.

The IMU 1775 can additionally receive one or more calibration parameters from the console 1720. As further discussed below, the one or more calibration parameters are used to maintain tracking of the HMD 1705. Based on a received calibration parameter, the IMU 1775 may adjust one or more of the IMU parameters (e.g., sample rate). In some embodiments, certain calibration parameters cause the IMU 1775 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 1740 receives content for the virtual scene from a (e.g., VR) engine 1745 and provides the content for display on the electronic display 1765. Additionally, the scene rendering module 1740 can adjust the content based on information from the vergence processing module 1730, the IMU 1775, and the head tracking sensors 1735. The scene rendering module 1740 determines a portion of the content to be displayed on the electronic display 1765 based on one or more of the tracking module 1755, the head tracking sensors 1735, or the IMU 1775, as described further below.

The imaging device 1710 generates slow calibration data in accordance with calibration parameters received from the console 1720. Slow calibration data includes one or more images showing observed positions of the locators 1770 that are detectable by imaging device 1710. The imaging device 1710 may include one or more cameras, one or more video cameras, other devices capable of capturing images including one or more locators 1770, or some combination thereof. Additionally, the imaging device 1710 may include one or more filters (e.g., for increasing signal to noise ratio). The imaging device 1710 is configured to detect light emitted or reflected from the locators 1770 in a field of view of the imaging device 1710. In embodiments where the locators 1770 include passive elements (e.g., a retroreflector), the imaging device 1710 may include a light source that illuminates some or all of the locators 1770, which retro-reflect the light towards the light source in the imaging device 1710. Slow calibration data is communicated from the imaging device 1710 to the console 1720, and the imaging device 1710 receives one or more calibration parameters from the console 1720 to adjust one or more imaging parameters (e.g., focal length, focus, frame rate, ISO, sensor temperature, shutter speed, aperture, etc.).

The input interface 1715 is a device that allows a user to send action requests to the console 1720. An action request is a request to perform a particular action. For example, an action request may be to start or end an application or to perform a particular action within the application. The input interface 1715 may include one or more input devices. Example input devices include a keyboard, a mouse, a game controller, or any other suitable device for receiving action requests and communicating the received action requests to the console 820. An action request received by the input interface 1715 is communicated to the console 1720, which performs an action corresponding to the action request. In some embodiments, the input interface 1715 may provide haptic feedback to the user in accordance with instructions received from the console 1720. For example, haptic feedback is provided by the input interface 1715 when an action request is received, or the console 1720 communicates instructions to the input interface 1715 causing the input interface 815 to generate haptic feedback when the console 1720 performs an action.

The console 1720 provides content to the HMD 1705 for presentation to the user in accordance with information received from the imaging device 1710, the HMD 1705, or the input interface 1715. In the example shown in FIG. 17, the console 1720 includes an application store 1750, a tracking module 1755, and the engine 1745. Some embodiments of the console 1720 have different or additional modules than those described in conjunction with FIG. 17. Similarly, the functions further described below may be distributed among components of the console 1720 in a different manner than is described here.

The application store 1750 stores one or more applications for execution by the console 1720. An application is a group of instructions, that when executed by a processor, generates content for presentation to the user. Content generated by an application may be in response to inputs received from the user via movement of the HMD 1705 or the input interface 1715. Examples of applications include gaming applications, conferencing applications, video playback application, or other suitable applications.

The tracking module 1755 calibrates the system 1700 using one or more calibration parameters and may adjust one or more calibration parameters to reduce error in determining position of the HMD 1705. For example, the tracking module 1755 adjusts the focus of the imaging device 1710 to obtain a more accurate position for observed locators 1770 on the HMD 1705. Moreover, calibration performed by the tracking module 1755 also accounts for information received from the IMU 1775. Additionally, if tracking of the HMD 1705 is lost (e.g., imaging device 1710 loses line of sight of at least a threshold number of locators 1770), the tracking module 1755 re-calibrates some or all of the system 1700 components.

Additionally, the tracking module 1755 tracks the movement of the HMD 1705 using slow calibration information from the imaging device 1710 and determines positions of a reference point on the HMD 1705 using observed locators from the slow calibration information and a model of the HMD 1705. The tracking module 1755 also determines positions of the reference point on the HMD 1705 using position information from the fast calibration information from the IMU 1775 on the HMD 1705. Additionally, the tracking module 1755 may use portions of the fast calibration information, the slow calibration information, or some combination thereof, to predict a future location of the HMD 1705, which is provided to the engine 1745.

The engine 1745 executes applications within the system 1700 and receives position information, acceleration information, velocity information, predicted future positions, or some combination thereof for the HMD 1705 from the tracking module 1755. Based on the received information, the engine 1745 determines content to provide to the HMD 1705 for presentation to the user, such as a virtual scene, one or more virtual objects to overlay onto a real world scene, etc.

In some embodiments, the engine 1745 maintains focal capability information of the multifocal structure 1760. Focal capability information is information that describes what focal distances are available to the multifocal structure 1760. Focal capability information may include, e.g., a range of focus the multifocal structure 260 is able to accommodate (e.g., 0 to 4 diopters), a resolution of focus (e.g., 0.25 diopters), a number of focal planes, combinations of settings for optical components of the multifocal structure 1760 that map to particular focal planes, combinations of settings for pixel optical components that map to particular focal planes, or some combination thereof.

The engine 1745 generates focus instructions for the multifocal structure 1760, the instructions causing the multifocal structure 1760 to adjust its focal distance to a particular location. The engine 1745 generates the focus instructions based on focal capability information and, e.g., information from the vergence processing module 1730, the IMU 1775, and the head tracking sensors 1735. The engine 1745 uses the information from the vergence processing module 1730, the IMU 1775, and the head tracking sensors 1735, or some combination thereof, to select an ideal focal plane to present content to the user. The engine 1745 then uses the focal capability information to select a focal plane that is closest to the ideal focal plane. The engine 1745 uses the focal information to determine settings for optical components within the multifocal structure 260 that are associated with the selected focal plane. The engine 1745 generates instructions based on the determined settings, and provides the instructions to the multifocal structure 1760.

Additionally, the engine 1745 performs an action within an application executing on the console 1720 in response to an action request received from the input interface 1715 and provides feedback to the user that the action was performed. The provided feedback may be visual or audible feedback via the HMD 1705 or haptic feedback via input interface 1715.

Figure 18:
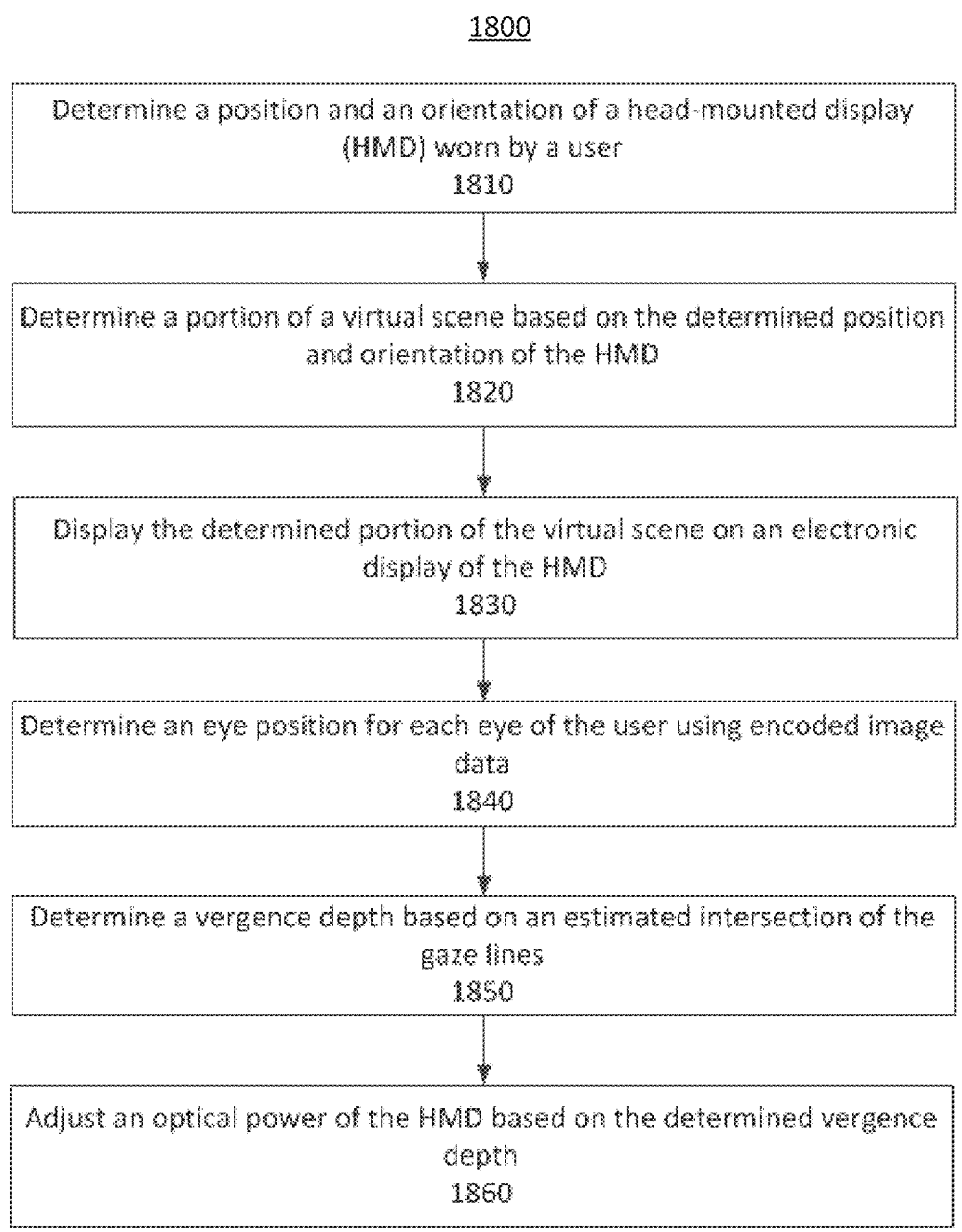
FIG. 18 illustrates a process for mitigating vergence-accommodation conflict by adjusting the focal length of a HMD, according to an embodiment.

FIG. 18 is a process 1800 for mitigating vergence-accommodation conflict by adjusting the focal length of an HMD 1705, according to an embodiment. The process 1800 may be performed by the system 1700 in some embodiments. Alternatively, other components may perform some or all of the steps of the process 1800. For example, in some embodiments, a HMD 1705 and/or a console (e.g., console 1720) may perform some of the steps of the process 1800. Additionally, the process 1800 may include different or additional steps than those described in conjunction with FIG. 18 in some embodiments or perform steps in different orders than the order described in conjunction with FIG. 18.

As discussed above, a system 1700 may dynamically vary its focus to bring images presented to a user wearing the HMD 1705 into focus, which keeps the user's eyes in a zone of comfort as vergence and accommodation change. Additionally, eye tracking in combination with the variable focus of the system 1700 allows blurring to be introduced as depth cues in images presented by the HMD 1705.

The system 1700 determines 1810 a position, an orientation, and/or a movement of HMD 1705. The position is determined by a combination of the locators 1770, the IMU 1775, the head tracking sensors 1735, the imagining device 1710, and the tracking module 1755, as described above in conjunction with FIG. 17.

The system 1700 determines 1820 a portion of a virtual scene based on the determined position and orientation of the HMD 1705. The system 1700 maps a virtual scene presented by the HMD 1705 to various positions and orientations of the HMD 1705. Thus, a portion of the virtual scene currently viewed by the user is determined based on the position, orientation, and movement of the HMD 1705.

The system 1700 displays 1830 the determined portion of the virtual scene being on an electronic display (e.g., the electronic display 1765) of the HMD 1705. In some embodiments, the portion is displayed with a distortion correction to correct for optical error that may be caused by the image light passing through the multifocal structure 260. Further, the multifocal structure 1760 has a state of optical components to provide focus and accommodation to the location in the portion of the virtual scene where the user's eyes are verged. The system 1700 determines 1840 an eye position for each eye of the user using encoded image data. The system 1700 determines a location or an object within the determined portion at which the user is looking to adjust focus for that location or object accordingly. For example, the optical sensor subsystem 101 generates image data, and the pre-processing subsystem 102 encodes the image data using a run-length encoding or contour encoding. The encoded image data is provided to the host system 104, which determines an eye position for each eye based on the encoded image data. Determining position of the eye may include identification of feature regions and their locations based on the encoded image data. The identification may include identifying blocks of data representing feature regions encoded using an encoding format, and extracting properties of the feature regions based on the bit values stored in the encoding format. In another embodiment, the encoded image data may be decoded by the host system 104 into a 2-bit image, and the eye features may be identified from the decoded image.

To determine the location or object within the determined portion of the virtual scene at which the user is looking, the HMD 1405 tracks the position and location of the user's eyes using encoded image data from the optical sensor subsystem 101 and/or the pre-processing subsystem 102. For example, the HMD 1405 tracks at least a subset of a 3D position, roll, pitch, and yaw of each eye and uses these quantities to estimate a 3D gaze point of each eye.

Figure 19:
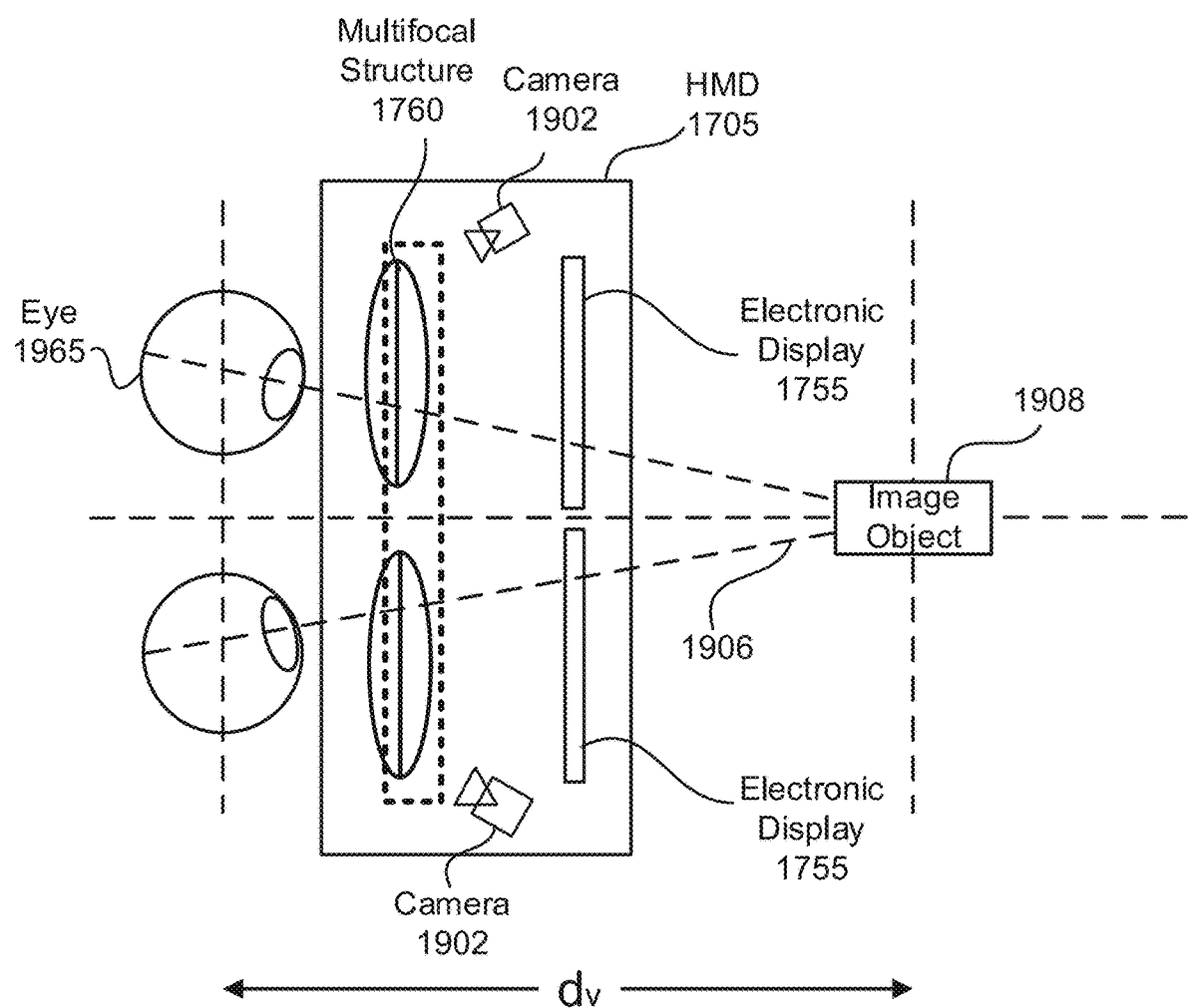
FIG. 19 illustrates an example process for mitigating vergence-accommodation conflict by adjusting a focal length of a multifocal structure, in accordance with an embodiment.

The system 1700 determines 1850 a vergence depth based on an estimated intersection of gaze lines. For example, FIG. 19 shows a cross section of an embodiment of the HMD 1705 that includes camera 1902 for tracking a position of each eye 1965, the electronic display 1765, and the multifocal structure 1760. In this example, the camera 1902 is part of the optical sensor subsystem 101 and captures images of the user's eyes looking at an image object 1908 and the eye tracking module 1725 determines an output for each eye 1965 and gaze lines 1906 corresponding to the gaze point or location where the user is looking based on the captured images. Accordingly, vergence depth (d) of the image object 1908 (also the user's gaze point) is determined 1850 based on an estimated intersection of the gaze lines 1906. As shown in FIG. 19, the gaze lines 1906 converge or intersect at distance d, where the image object 1908 is located. In some embodiments, information from past eye positions, information describing a position of the user's head, and information describing a scene presented to the user may also be used to estimate the 3D gaze point of an eye in various embodiments.

Accordingly, referring again to FIG. 18, the system 1700 adjusts 1860 an optical power of the HMD 1705 based on the determined vergence depth. The system 1700 selects a focal plane closest to the determined vergence depth by controlling optical components of the multifocal structure 1760. The optical power of the multifocal structure 1760 is adjusted to change a focal distance of the HMD 1705 to provide accommodation for the determined vergence depth corresponding to where or what in the displayed portion of the virtual scene the user is looking.

CONCLUSION

The foregoing describes a system embodiment and several data-reduction method embodiments that can be used to reduce the data stream conveyed from an eye-tracking sensor to system functional blocks that would process the received data, such as a host processor. The exemplary embodiments disclosed should not be read as limiting the invention to just these examples. For example, a run-length encoding techniques may employ other types of encoding decisions in addition to those disclosed to reduce the data stream.

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. A method, comprising:
  receiving a stream of image data of an eye generated by a sensor;
  assigning pixels of the image data to a pupil region of the eye, a glint region of the eye, and a background region by comparing pixel values of the pixels to threshold values;

generating encoded image data by applying an encoding algorithm to the image data for the pixels of the pupil region, the glint region, and the background region, the encoded image data having a smaller data size than the image data, the encoded image data having an encoding format using a sequence of bits for encoding a region, the sequence of bits including either a first plurality of bits to define the region as one of the pupil region or the glint region or a single bit to define the region as the background region, the sequence of bits further including a second plurality of bits to define a run length of pixels assigned to the region; and transmitting an output stream including the encoded image data to a computing device.

2. The method of claim 1, wherein the sequence of bits includes a bit to define a bit length of the sequence of bits.

3. The method of claim 1, wherein the sequence of bits includes a third plurality of bits to define a row number and a fourth plurality of bits to define a column number.

4. The method of claim 1, wherein transmitting the encoded image data includes transmitting a data stream including the image data interleaved with the encoded image data.

5. The method of claim 1, further comprising filtering the image data to reduce optical noise prior to applying the encoding algorithm to the image data.

6. The method of claim 1, wherein assigning the pixels of the image data to the pupil region, the glint region, and the background region includes generating the pixels values of the pixels by converting color values to gray scale values.

7. The method of claim 1, wherein the sequence of bits includes a third plurality of bits defining an average grey level of the region.

8. The method of claim 1, further including outputting gaze contingent content rendered based on eye position of the eye as defined by the encoded image data to an electronic display.

9. An eye tracking device, including:
a sensor configured to generate image data of an eye; and
circuitry configured to:
receive the image data generated by the sensor;
assign pixels of the image data to a pupil region of the eye, a glint region of the eye, and a background region by comparing pixel values of the pixels to threshold values;
generate encoded image data by apply an encoding algorithm to the image data for the pixels of the pupil region, the glint region, and the background region, the encoded image data having a smaller data size than the image data, the encoded image data having an encoding format using a sequence of bits for encoding a region, the sequence of bits including either a first plurality of bits to define the region as one of the pupil region or the glint region or a single bit to define the region as the background region, the sequence of bits further including a second plurality of bits to define a run length of pixels assigned to the region; and
transmit the encoded image data to a computing device separate from the eye tracking device.

10. The eye tracking device of claim 9, wherein the sequence of bits includes a bit to define a bit length of the sequence of bits.

11. The eye tracking device of claim 9, wherein the sequence of bits includes a third plurality of bits to define a row number and a fourth plurality of bits to define a column number.

12. The eye tracking device of claim 9, wherein transmitting the encoded image data includes transmitting a data stream including the image data interleaved with the encoded image data.

13. The eye tracking device of claim 9, wherein the circuitry is further configured to filter the image data to reduce optical noise prior to applying the encoding algorithm to the image data.

14. The eye tracking device of claim 9, wherein the circuitry configured to assign the pixels of the image data to the pupil region, the glint region, and the background region includes the circuitry being configured to generate the pixels values of the pixels by converting color values to gray scale values.

15. The eye tracking device of claim 9, wherein the sequence of bits includes a third plurality of bits defining an average grey level of the region.

16. The eye tracking device of claim 9, wherein the circuitry is further configured to output gaze contingent content rendered based on eye position of the eye as defined by the encoded image data to an electronic display.

17. A non-transitory computer readable medium storing instructions that when executed by a processor, configures the processor to:
receive image data of an eye generated by a sensor;
assign pixels of the image data to a pupil region of the eye, a glint region of the eye, and a background region by comparing pixel values of the pixels to threshold values;
generate encoded image data by apply an encoding algorithm to the image data for the pixels of the pupil region, the glint region, and the background region, the encoded image data having a smaller data size than the image data, the encoded image data having an encoding format using a sequence of bits for encoding a region, the sequence of bits including either a first plurality of bits to define the region as one of the pupil region or the glint region or a single bit to define the region as the background region, the sequence of bits further including a second plurality of bits to define a run length of pixels assigned to the region; and
transmit the encoded image data to a computing device separate from the processor.

* * * * *